Oct. 21, 1947.   R. M. MATSON   2,429,559
TUBE CUTTING APPARATUS
Filed Oct. 25, 1944   2 Sheets-Sheet 1

Inventor
Rudolph M. Matson
By Robert M. Dunning
Attorney

Oct. 21, 1947.                    R. M. MATSON                    2,429,559
                              TUBE CUTTING APPARATUS
                            Filed Oct. 25, 1944                 2 Sheets-Sheet 2
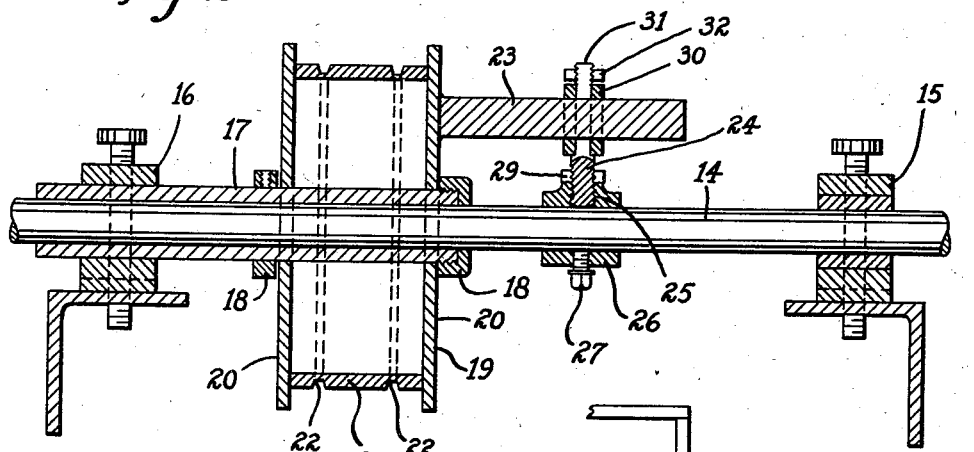
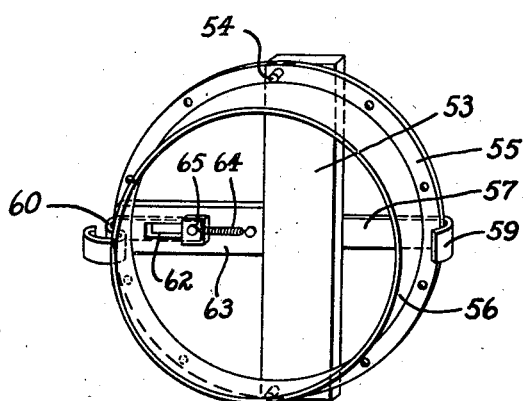
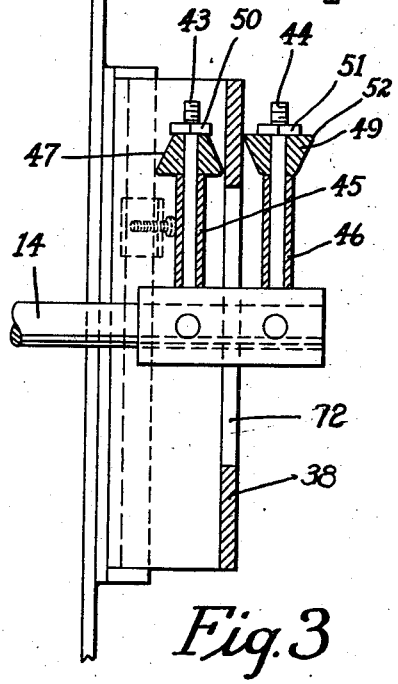
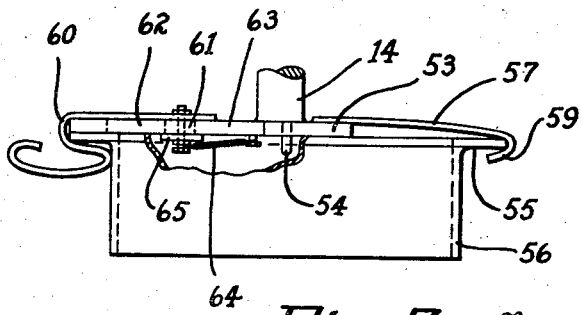
Inventor
Rudolph M. Matson
By Robert M. Dunning
Attorney

UNITED STATES PATENT OFFICE 2,429,559

TUBE CUTTING APPARATUS

Rudolph M. Matson, St. Paul, Minn.

Application October 25, 1944, Serial No. 560,247

12 Claims. (Cl. 266—23)

My invention relates to an improvement in tube cutting apparatus wherein it is desired to provide a mechanism for cutting short tubes or collars along straight or irregular lines.

An object of the present invention lies in the provision of a means for cutting a tube along a predetermined line. For example, when a tubular collar is to be attached to a cylindrical surface, it is necessary to cut the collar along an irregular path so as to fit the contour of the cylindrical surface. To simplify this cutting operation I have produced a simple apparatus capable of accomplishing the desired result in a fraction of the time required to cut such collars manually.

A feature of the present invention lies in providing a rotatable support for a collar so that the collar may be rotated relative to a fixed cutting torch. This cutting torch acts to cut through the tube or collar as the same is rotated and moved axially in accordance with a predetermined pattern.

A feature of the present invention lies in the use of a self-propelled cutting torch support for furnishing the movement of the collar. Cutting torches supported on movable bases which are movable along tracks are in common use at the present time. In operating my tube cutting apparatus I provide a drum on the operating shaft of the apparatus, upon which drum the carriage of the self-propelled cutting torch is engaged. The drum is operated by frictional engagement with the propelling wheels of the cutting torch carriage, thus rotating the operating shaft which in turn rotates the collar being cut.

A feature of the present invention lies in the provision of a pattern which is engageable with roller means supported by the operating shaft. Upon rotation of the operating shaft the roller means carried thereby engages the pattern and moves the operating shaft axially in accordance with the configuration of the pattern. Thus as the operating shaft is rotated it is also moved longitudinally, thereby causing the cutting torch to cut the tube or collar along any predetermined path.

A novel feature of the present invention lies in the supporting means which I employ for the tubes or collars. These tubes or collars are tightly supported upon the operating shaft of my apparatus to rotate therewith. However, upon release of a spring latch holding the collar in engaged position spring means cause the collar to be thrown bodily clear of my apparatus. Thus the collars need not be handled after the cutting operation until they have cooled sufficiently to permit handling thereof without danger of injury.

These and other objects and novel features of my invention will be more clearly and fully set forth in the following specification and claims.

In the drawings forming a part of my specification:

Figure 2 is a sectional view through the mechanism mounted upon the operating shaft.

Figure 3 is a sectional view through the pattern and the rollers which engage the pattern.

Figure 4 is a perspective view of the collar supporting mechanism.

Figure 5 is a side elevational view of the collar supporting mechanism.

Figure 1:
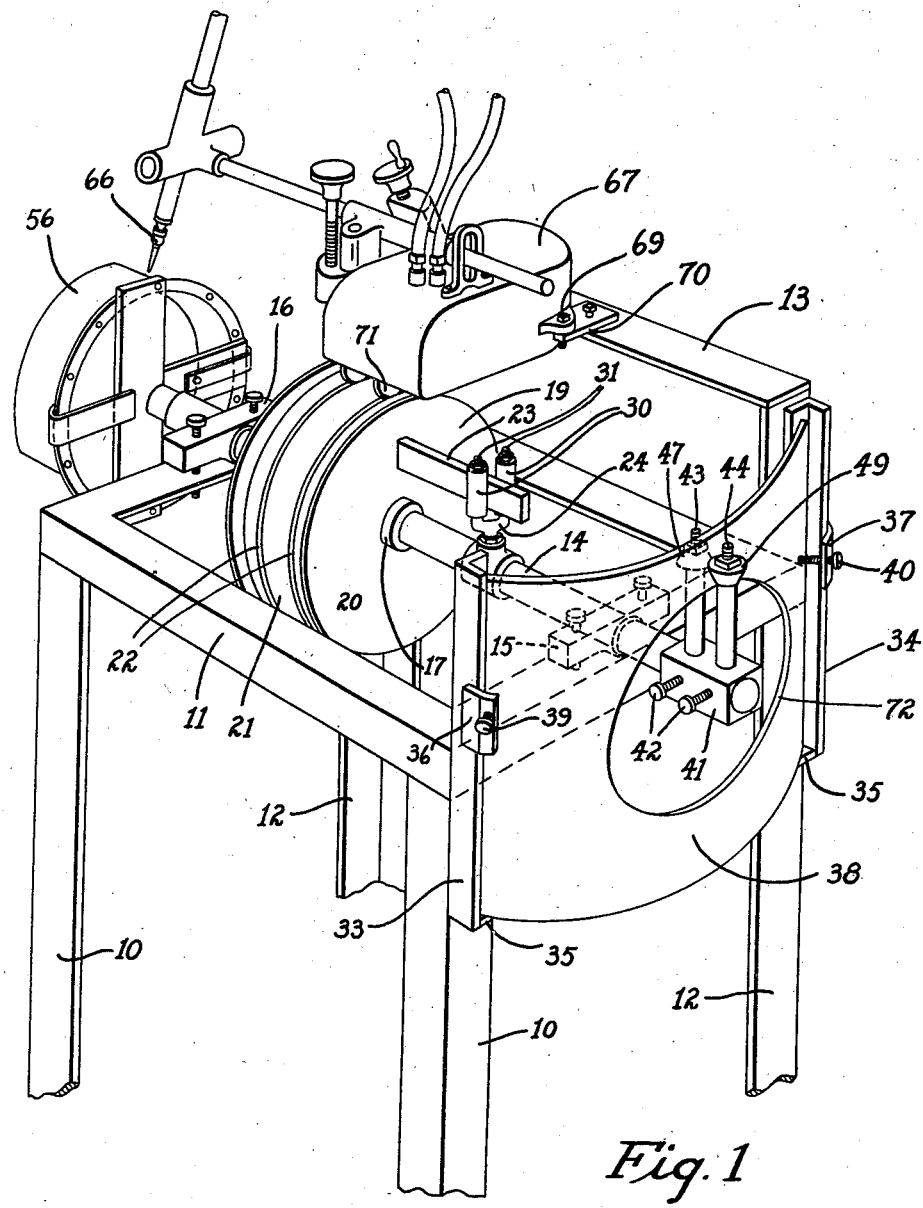
Figure 1 is a perspective view of my mechanism in readiness for operation.

My apparatus is mounted upon a bench or table including supporting legs 10 which support a substantially rectangular angle iron frame 11. Two of the legs of my table 12 extend upwardly above the level of the frame 11 to support transversely extending brace 13 which is used for a purpose which will later be described in detail.

An operating shaft 14 is supported upon the frame 11 and is held in position by suitable bearings 15 and 16. The bearings 15 and 16 are of any suitable type to accomplish the desired result and support the shaft 14 freely rotatable.

A sleeve 17 is mounted upon the shaft and extends into the bearing 16, thus forming a bushing for rotatably supporting the shaft 14. The sleeve 17 is rigidly supported within the bearing 16 and acts as a support for the shaft 14. The sleeve 17 is rigidly supported within the bearing 16 and acts as a support for the shaft.

A drum 19 is mounted between collars 18 on the shaft 17. The drum 19 rotates freely about the sleeve 17 and includes a pair of end plates 20 and a cylindrical sleeve 21 between these end plates 20. Spaced tapered grooves 22 are provided in the sleeve 21 for a purpose which will be later described in detail.

A flat bar 23 extends outwardly from the face of one end plate 20 and is substantially normal to the surface of the plate 20. A fork shaped yoke 24 is provided with a threaded shank 25 extending into a collar 26 secured to the shaft 14 by a set screw 27. A lock nut 29 on the shank 25 holds the shank in set position. A pair of sleeves 30 are supported upon the bifurcated end portions 31 of the yoke 24 and these sleeves are held in place by any suitable means such as the nuts 32.

The bar 23 and yoke 24 provide a drive which causes rotation of the drum 19 with the shaft 14 while still permitting axial movement of the shaft 14 relative to the drum. The ability to rotate the shank 24 in the collar 26 is of importance as it permits the yoke to compensate for any wear of the rollers 30 or bar 23. As the rollers and bar wear the yoke may be slightly twisted until both rollers are again in firm contact with opposite sides of the bar and the lock nut 29 may then be tightened to hold the yoke in this position.

Opposed angle irons 33 and 34 are provided upon opposed legs 10 and 12 in order to support a pattern plate 38. The pattern plate 38 is curved or angled so as to provide the proper axial movement of the shaft 14 as the shaft rotates so as to move the collar in the proper path during the cutting operation. The pattern plate 38 rests upon stop lugs 35 or suitable set screws at the bottom of the angle iron supports 33 and 34. Brackets 36 and 37 are supported by the angle iron members 33 and 34 respectively to support set screws 39 and 40 respectively, which hold the pattern plate 38 in place. The set screws 39 and 40 are angled inwardly so as to properly engage the plate regardless of its shape and one bracket 36 is preferably sufficiently short and straight to permit easy withdrawal of the plate 38 from its position.

A block 41 is held on one extreme end of the shaft 14 by set screws 42 or the like. The block 41 supports a pair of radially extending parallel shafts 43 and 44 which in turn support pattern engaging rollers. Spacing sleeves 45 and 46 are mounted upon the shafts 43 and 44 and conically shaped rollers 47 and 49 are held in place upon the respective shafts by nuts 50 and 51. As illustrated in Figure 3 of the drawings the rollers 47 and 49 are mounted with the bearing ends not in opposed relationship. The large end of the roller 47 is closer to the axis of the shaft 14 than is the large diameter bearing surface 52 of the roller 49. This compensates for the angularity of the pattern plate 38.

A transverse bar 53 is secured to the other end of the shaft 14 as illustrated in Figures 4 and 5 of the drawings. A pair of pins 54 having their axes parallel the axis of the shaft 14 protrude from the cross member 53 near the opposite ends thereof. These pins 54 are designed to extend through opposed apertures in a flange 55 attached to the cylinder tube or collar 56. A spring strip 57 etxends from the cross member 53 at right angles thereto and is provided with a hook end 59 designed to engage over the flange 55. A spring latch 60 slidably supported by a cross head 61 slidable in a slot 62 in the radially extending bar 63 engages over the opposite side of the flange 55. A spring 64 urges the latch 60 into engaged position, the spring extending between the cross bar 53 and the projection on the plate 65 supported by the cross head 61 and slidable therewith. The plate 65 is of larger dimensions than the cross head 61 so as to hold the cross head engaged in the notch 62.

When the collar 56 is supported by the support described the spring arm 57 is flexed forwardly. Therefore upon completion of the cutting operation when the latch 60 is released from engagement with the flange 55, this spring 57 returns to normal position, thus moving the portion of the flange 55 engaged by the hook end 59 toward the frame of the cutting apparatus and thus throwing the opposite side of the collar outwardly away from the bar 63. Thus the collar is forced by spring action out of its support.

A cutting torch 66 is adjustably supported by a carriage 67 of a type normally used to carry the torch along an elongated straight track. One end of the carriage 67 is connected at 60 to brackets 70 supported by the cross member 13. The other end of the carriage is provided with propelling wheels or rollers 71 by means of which the carriage is carried along its track. In the present instance, however, the wheels or rollers 71 are engaged in the grooves 22 in the drum 19 acting when in operation to slowly revolve the drum about its axis.

The operation of my tube cutting apparatus is believed obvious from the foregoing description. In operation the torch is lighted and the carriage 66 is set into operation. The wheels 71 rotate, thus rotating the drum 19 and accordingly the shaft 14. The rollers 47 and 49 engage the pattern plate 38 about its aperture 72, these rollers moving the shaft 14 longitudinally. Longitudinal movement of the shaft 14 acts to move the collar 56 longitudinally as well as angularly about its center. As a result the collar 56 is cut along an irregular line. Rotation of the collar is continued until the end portion thereof is entirely cut off, at which time the torch 66 can be raised or shut off. The latch 60 may then be operated and the spring 57 acts to throw the cut collar clear of the machine into a suitable receptacle. This obviates the necessity of handling the heated collar when removing the same.

In the event collars other than cylindrical are to be cut a drum 20 of the same shape must be employed. The brackets 70 are then either hinged on or formed of flexible material to permit the raising and lowering of the front end of the cutting torch. The drum 19 may thus be oval if the collar to be cut is oval and the cutting torch is raised and lowered by engagement of the wheels 71 upon the similarly shaped drum. Obviously the drum and collar must be in proper rotatable alignment if these elements are not cylindrical in shape.

In accordance with the patent statutes, I have described the principles of construction and operation of my tube cutting apparatus, and while I have endeavored to set forth the best embodiments thereof, I desire to have it understood that obvious changes may be made within the scope of the following claims without departing from the spirit of my invention.

I claim:

1. A tube cutting or marking apparatus comprising a rotatable support for the tube, drum means of an outer shape similar to the tube surface to be cut or marked secured to said rotatable support to rotate therewith, a cutting or marking instrument, a carriage supporting said instrument, and rotatable means on said carriage engaging said drum to rotate the same.

2. A tube cutting or marking apparatus comprising a rotatable support for the tube, drum means of an outer shape similar to the tube surface to be cut or marked secured to said rotatable support to rotate therewith, a cutting or marking instrument, a carriage supporting said instrument, rotatable means on said carriage engaging said drum to rotate the same, and means for moving said tube axially upon rotation thereof.

3. A tube cutting or marking apparatus comprising a rotatable support for the tube, drum means of an outer shape similar to the tube surface to be cut or marked secured to said rotatable support to rotate therewith, a cutting or marking instrument, a carriage supporting said instrument, rotatable means on said carriage engaging said drum to rotate the same, means for moving said drum axially upon rotation thereof, and means connecting said drum and said tube support to permit axial movement of said tube support without axially moving said drum.

4. A tube cutting or marking mechanism comprising a frame, a shaft supported by said frame and axial for rotary movement with respect thereto, a drum of an outer shape similar to the tube surface to be cut or marked mounted upon said shaft, means connecting said drum and said shaft operable to move said shaft in a rotary direction with said drum while permitting axial movement of said shaft relative to said drum, a cutting or marking instrument, a carriage supporting said instrument, and rotary means on said carriage engaging said drum to rotate the same.

5. A tube cutting or marking mechanism comprising a frame, a shaft supported by said frame and axial for rotary movement with respect thereto, a drum of an outer shape similar to the tube surface to be cut or marked mounted upon said shaft, means connecting said drum and said shaft operable to move said shaft in a rotary direction with said drum while permitting axial movement of said shaft relative to said drum, a cutting or marking instrument, a carriage supporting said instrument, rotary means on said carriage engaging said drum to rotate the same, template means, and means on said shaft engageable with said template to move said shaft axially.

6. A tube cutting or marking mechanism comprising a frame, a shaft rotatable and axially movable upon said frame, a tube support on said shaft, a drum of an outer shape similar to the tube surface to be cut or marked secured on said shaft held from longitudinal movement relative to said frame, means cooperating between said shaft and said drum for rotating the same in unison, a cutting instrument, a carriage supporting said cutting or marking instrument, one end of said carriage being supported by said frame, the other end of said torch resting upon said drum, and rotating means on said carriage engaging said drum for rotating said drum.

7. A tube cutting or marking means comprising a tube support, means rotatably supporting said support, a cutting or marking instrument, a self-propellable carriage supporting said instrument adjacent said tube, said self-propellable carriage operating to rotate said shaft.

8. A tube cutting or marking mechanism comprising a support, a shaft rotatably supported thereby, a tube support mounted upon said shaft, a cutting or marking instrument, a self-propellable carriage having propelling wheels, said carriage supporting said instrument, and means on said shaft of an outer shape similar to the tube surface to be cut or marked engaging the propeller wheels of said carriage to rotate said shaft upon rotation of said propelling wheels.

9. A tube cutting or marking apparatus comprising a support, a shaft rotatably and slidably mounted thereupon, a tube support secured to said shaft, a cutting or marking instrument, a carriage having propelling wheels thereupon supporting said instrument, means on said shaft of an outer shape similar to the tube surface to be cut or marked actuated by said propelling wheels to rotate said shaft, a template secured to said frame, and roller means supported by said shaft and engageable with said template to move said shaft longitudinally upon rotation of said shaft.

10. A tube cutting or marking mechanism comprising a frame, a shaft rotatably and slidably supported on said frame, a tube support mounted upon said shaft and rotatable therewith, a cutting or marking instrument, a carriage having propelling wheels thereupon supporting said instrument, means on said shaft of an outer shape similar to the tube surface to be cut or marked driven by said propelling wheels, a template having an aperture therein, spaced roller means supported by said shaft and engageable with opposite surfaces of said template, said roller means being operable to move said shaft longitudinally upon rotation thereof.

11. A tube cutting or marking mechanism comprising a frame, a shaft rotatably and slidably supported on said frame, a tube support mounted upon said shaft and rotatable therewith, a cutting or marking instrument, a carriage having propelling wheels thereupon supporting said instrument, means on said shaft of an outer surface similar to the tube surface to be cut or marked driven by said propelling wheels, a template having an aperture therein, spaced roller means supported by said shaft and engageable with opposite surfaces of said template, said roller means being operable to move said shaft longitudinally upon rotation thereof, said roller means being spaced different distances from the axis of said shaft.

12. A tube cutting or marking mechanism comprising a frame, a shaft rotatably mounted thereon, means for rotating said shaft, a cutting or marking instrument supported adjacent said tube, and a tube support on said shaft, said tube support comprising means marginally engaging said tube at three angularly spaced points, and spring means resiliently engaging said tube at a fourth angularly spaced point.

RUDOLPH M. MATSON.

REFERENCES CITED

The following references are of record in the file of this patent:

UNITED STATES PATENTS

| Number | Name | Date |
| --- | --- | --- |
| 577,023 | Hancock et al. | Feb. 16, 1897 |
| 1,071,940 | Merrill | Sept. 2, 1913 |
| 1,377,160 | Tukkainen | May 3, 1921 |
| 1,396,993 | Carter | Nov. 15, 1921 |
| 1,403,901 | Field et al. | Jan. 17, 1922 |
| 1,553,441 | Grunwald | Sept. 15, 1925 |
| 1,661,274 | Steere et al. | Mar. 6, 1928 |
| 1,858,076 | Douglass | May 10, 1932 |
| 1,907,957 | Gerber | May 9, 1933 |